United States Patent [19]
Von Fange

[11] Patent Number: 6,152,426
[45] Date of Patent: Nov. 28, 2000

[54] EXTENSIBLE BOOM

[76] Inventor: Eric Eugene Von Fange, 1900 Sun Valley La., Fort Mill, S.C. 29715

[21] Appl. No.: 09/435,138

[22] Filed: Nov. 5, 1999

Related U.S. Application Data

[60] Provisional application No. 60/107,440, Nov. 6, 1998.

[51] Int. Cl.[7] ................................................. B66D 1/36
[52] U.S. Cl. ..................... 254/334; 254/342; 254/376; 211/117; 248/327
[58] Field of Search .................................. 254/329, 334, 254/342, 376, 380; 211/117; 248/327, 328, 329

[56] References Cited

U.S. PATENT DOCUMENTS

| | | | |
|---|---|---|---|
| 580,896 | 4/1897 | Quackenbush | 254/334 |
| 847,196 | 3/1907 | McBee | 248/327 |
| 1,178,343 | 4/1916 | Woodworth | 211/117 |
| 1,222,242 | 4/1917 | Woodworth | 211/117 |
| 3,512,743 | 5/1970 | Lispcomb | 248/327 |
| 4,647,014 | 3/1987 | Ekman | 254/334 |
| 4,695,040 | 9/1987 | Hantschk | 254/334 |
| 5,083,395 | 1/1992 | Daniels | 254/334 |
| 5,176,365 | 1/1993 | Best | 254/342 |
| 5,205,544 | 4/1993 | Kroeger | 254/329 |
| 5,607,143 | 3/1997 | Regal | 254/342 |

*Primary Examiner*—Donald P. Walsh
*Assistant Examiner*—Emmanuel M. Marcelo
*Attorney, Agent, or Firm*—Gene Scott-Patent Law & Venture Group

[57] ABSTRACT

An extensible boom or strut has a telescoping action easily adjusted for appropriate length, and further is capable of attachment to a fixed point such as on a ceiling or wall at one end, and a lighting fixture or such at the other end. A torque tube is engaged with a cable winding device for playing out and winding up the cable which pulls on the innermost segment of the boom to shorten it or relaxes to allow gravitational force to lengthen it.

6 Claims, 1 Drawing Sheet

EXTENSIBLE BOOM

This application claims the priority date of a prior filed provisional patent application with assigned Ser. No. of 60/107,440 and assigned filing date of Nov. 6, 1998 and claims essentially the same invention as the stated prior filed provisional application for matter common thereto.

BACKGROUND OF THE INVENTION

1. Field of the Invention

This invention relates generally to adjustable and portable struts and standoffs, and more particularly to a telescoping strut for supporting and positioning a lamp, microphone or other stage equipment and which is capable of being linearly adjusted.

2. Description of Related Art

The prior art generally teaches stage equipment such as sound booms and other apparatus for supporting equipment. However, the prior art does not teach that such a device may be constructed to operate for elongation as needed in each application to which it is applied in a manner that is secure, simple to operate and inexpensive to produce and use. The present invention fulfills these needs and provides further related advantages as described in the following summary.

SUMMARY OF THE INVENTION

The present invention teaches certain benefits in construction and use which give rise to the objectives described below.

The present invention provides an extensible boom or strut having telescoping action easily adjusted for appropriate length, and further providing a means for attachment to a fixed point and a means for attachment of a fixture thereto.

A primary objective of the present invention is to provide an extensible boom having advantages not taught by the prior art.

Another objective is to provide such a boom enabled for manual length adjustment to any selected length of choice for each application.

A further objective is to provide such a boom having lightweight and yet rigid structure.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figures 1, 2:
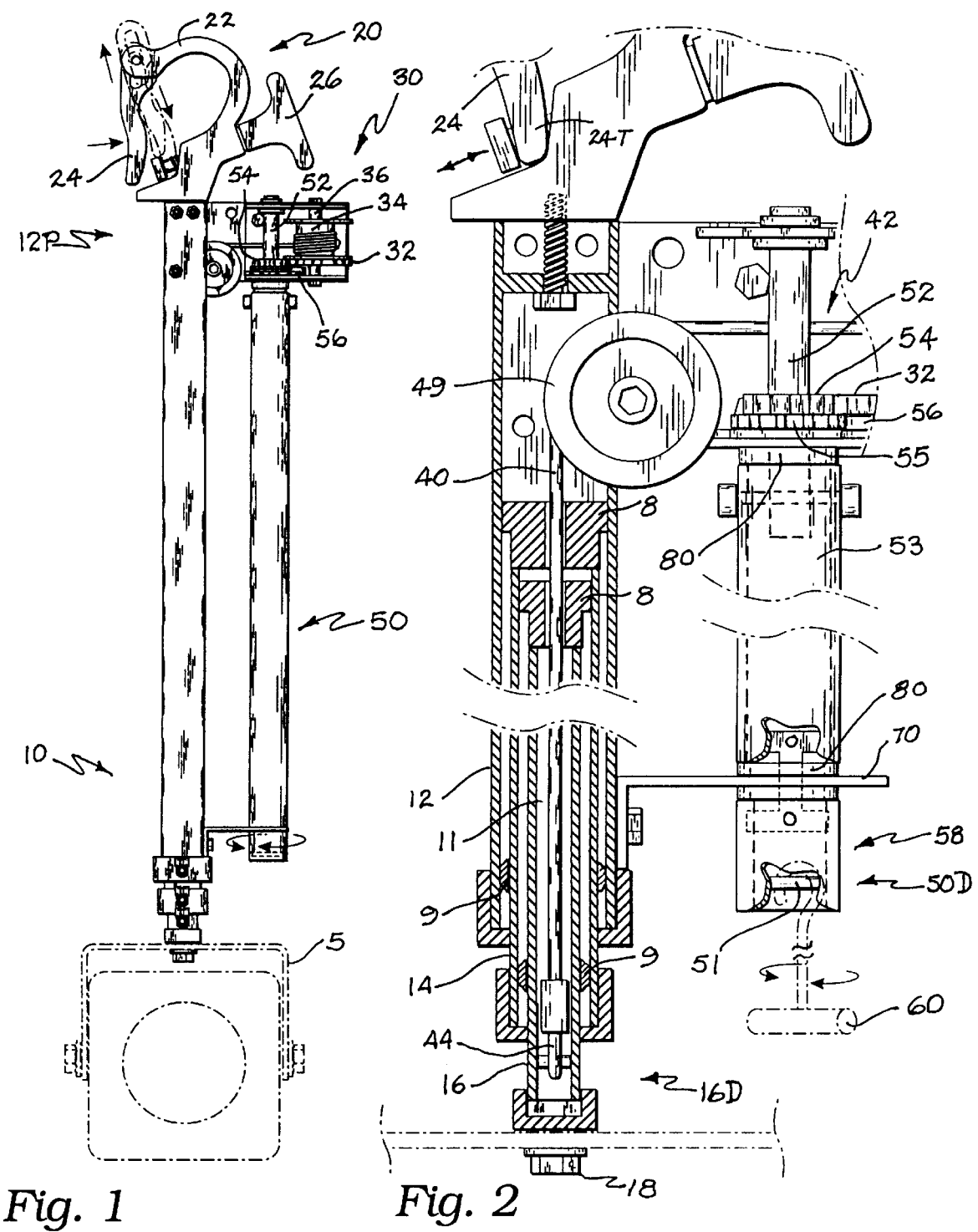
FIG. 1 is a side elevational view of the preferred embodiment of the present invention.
FIG. 2 is a partial sectional view thereof showing the interior of a telescoping leg of the invention.

The above described drawing figures illustrate the invention, an apparatus comprising a cylindrical telescoping pole 10; an assembly of a series of interengaged non-round pole segments 12, 14, 16, one longitudinally movable within the next so as to extend and retract and preferably non-round so that they cannot rotate one within the other. The tubes may be square, triangular, hexagonal or any other non-round shape. The innermost pole segment 16 provides, at a distal end 16D, a means for attachment 18 thereto such as the bolt and nut shown in FIG. 2 so that a lamp 5 or other equipment may be mounted to the pole 10. The outermost pole segment 12 provides, at a proximal end 12P, a hanging means 20 such as the locking hook shown in FIG. 1, for supporting the apparatus from a fixture (not shown) such as an eye-bolt fastened to a ceiling, a pipe, or other fixed structural element. Each of the segments 14 and 16 provide a cap 8 fixed at the proximal end and sized for sliding contact with the interior surface of the next larger tube 12 and 14 respectively for centering and guiding the tube segment as it moves relative to the next larger tube segment. Each of the segments 12 and 14 provide a ring 9, or this element may be instead one or more individual spacers but not necessarily formed into a ring, fixed within each of these tubes and slidably engaged with the next smaller tube segment for centering and guiding relative tube segment motion. In this manner the tubes are maintained in mutually concentric positions while allowing linear relative motion. A further advantage is that placement of the ring 9 (or non-ring individual spacers) in each case may be positioned so that when the inner tube is extended, the cap 8 will contact the ring 9 thereby preventing further disengagement of the tubes so as to assure strength at the point where the inner tube engages the outer tube. Thus, the amount of tube overlap at the joint is selectable.

Preferably, the hanging means 20 has a hook structure comprising a curved and fixed segment 22 and, attached thereto, a movable segment 24 which is locked into place by a handle actuated fastener 26 which is positioned to capture the movable segment 24 near its tip 24T as best seen in FIG. 2. Further at the proximal end 12P of the pole 10, a cable winding and storing means 30 is mounted. This device will be further described below but it should be noted that it is used for winding and unwinding a cable 40 or other flexible, tensile member. The cable 40 is engaged at one end 42 thereof with the cable winding and storing means 30, as shown in FIG. 1, and is engaged at the other end 44 thereof with the distal end 16D of the telescoping pole 10. This is accomplished by moving the cable over a pulley 49 rotatably fastened to the telescoping pole 10 and positioned for directing the cable 40 from the cable winding and storing means 30 to the distal end of the telescoping pole 10.

The cable 40 is played out from the cable winding and storing means 30 and is fed through an interior space 11 of the telescoping pole 10. A cable feeding and takeup means 50 comprises a rotating shaft 52 which drives a spool drive gear 54, ratchet gear 55 and pawl 56 and is engaged with a winding coupler 58 through a torque tube 53 such that manual rotation of the coupler 58 rotates shaft 52 in a first rotational sense playing out the cable 40 from the cable winding and storing means 30, the telescoping pole 10 thereby extending in length through gravitational force under its own weight as long as it is in a more or less downwardly directed attitude, and such that manual rotation of the shaft 52 in a counter rotational sense draws the cable 40 onto the cable winding and storing means 30, the telescoping pole 10 thereby retracting in length so as to raise the distal end 16D. This is made possible by the fact that the cable feeding and takeup means 30 comprises a spool gear 32 meshed and driven by the spool drive gear 54 and a cable spool 34 engaged with the spool gear 54.

The ratchet gear 55 and pawl 56 are placed for holding the cable 40 from unwinding during manual rotation of the cable feeding and takeup means 50 in the counter rotational sense, i.e., drawing the telescoping pole 10 into retraction. This is necessary since the weight of the pole segments tend to pull cable 40 out of the spool 34 which is rotationally mounted on shaft 36.

The cable feeding and takeup means 50 further comprises, at a distal end 50D thereof, a hook receiving means 51, such as the pin shown, for accepting a manual crank bar 60 for rotating the cable feeding and takeup means 50. Inventively, a bracket 70 is mounted onto the outermost segment of the telescoping pole 10 for securing the torque tube 53 in a position parallel to the pole 10. This is possible because the shaft 52 is coupled to the torque tube 53 which allows the coupler 58 to be placed near the distal end of the pole 10 or at any alternative location desired. The torque tube 53 is used inventively in this apparatus because beside providing torque transfer to the shaft 52, it also provides mechanical stability in its wide-footed contact with friction washers 80.

In use the apparatus is attached to a ceiling fixture at hanging means 20 and is allowed to hang downwardly or at an angle supported by any fixture of convenience such as a laterally attached cable, etc. A fixture such as the lamp 5 is attached to the distal end 16D of the pole 10 and the pole 10 is then extended by rotating coupling 58 which enables the off-winding of cable 40 from spool 34. The pawl 56 continues to hold ratchet gear 55 as the cable is unwound so that the pole 10 cannot extend fully unless desired. When the apparatus is no longer needed, it may be retracted and moved to an alternate site for further use in the same manner with the same fixture 5 or a different fixture.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus comprising:
    a cylindrical telescoping pole providing at a distal end thereof, a means for attachment thereto and at a proximal end thereof, a means for supporting the apparatus from a fixture, and further at the proximal end thereof, a cable winding and storing means;
    a cable engaged at one end thereof with the cable winding and storing means and engaged at the other end thereof with the distal end of the telescoping pole, the cable being played out of the cable winding and storing means and fed through an interior space of the telescoping pole;
    a pulley rotatably fastened to the telescoping pole and positioned for directing the cable from the cable winding and storing means to the distal end of the telescoping pole; and
    a cable feeding and takeup means engaged with the cable winding and storing means such that manual rotation of the cable feeding and takeup means in a first rotational sense plays out the cable from the cable winding and storing means, the telescoping pole thereby extending in length through gravitational force, and such that manual rotation of the cable feeding and takeup means in a counter rotational sense draws the cable onto the cable winding and storing means the telescoping pole thereby retracting in length.

2. The apparatus of claim 1 wherein the cable winding and storing means further comprises a ratchet gear and pawl enabled for holding the cable from unwinding during manual rotation of the cable feeding means.

3. The apparatus of claim 1 wherein the cable feeding and takeup means further comprises a hook receiving means for accepting a crank for rotating the cable feeding and takeup means.

4. The apparatus of claim 1 wherein the cable feeding and takeup means includes a torque tube restrained in a parallel position to the telescoping pole and rotationally mounted thereon.

5. The apparatus of claim 1 wherein the telescoping pole comprises a plurality of tubular segments, one axially movable within the next, each of the tubular segments having a cap fixed at a proximal end of the tubular segment and sized for contact with an interior surface of the next larger tubular segment so as to enable centering and guiding of each of the tube segments.

6. The apparatus of claim 5 further comprising at least one movement limiting spacer engaged with the tubular segments and positioned so as to stop relative disengagement of the segments.

* * * * *